Oct. 11, 1932.   G. A. HARPER   1,881,537
VALVE
Filed Nov. 14, 1930
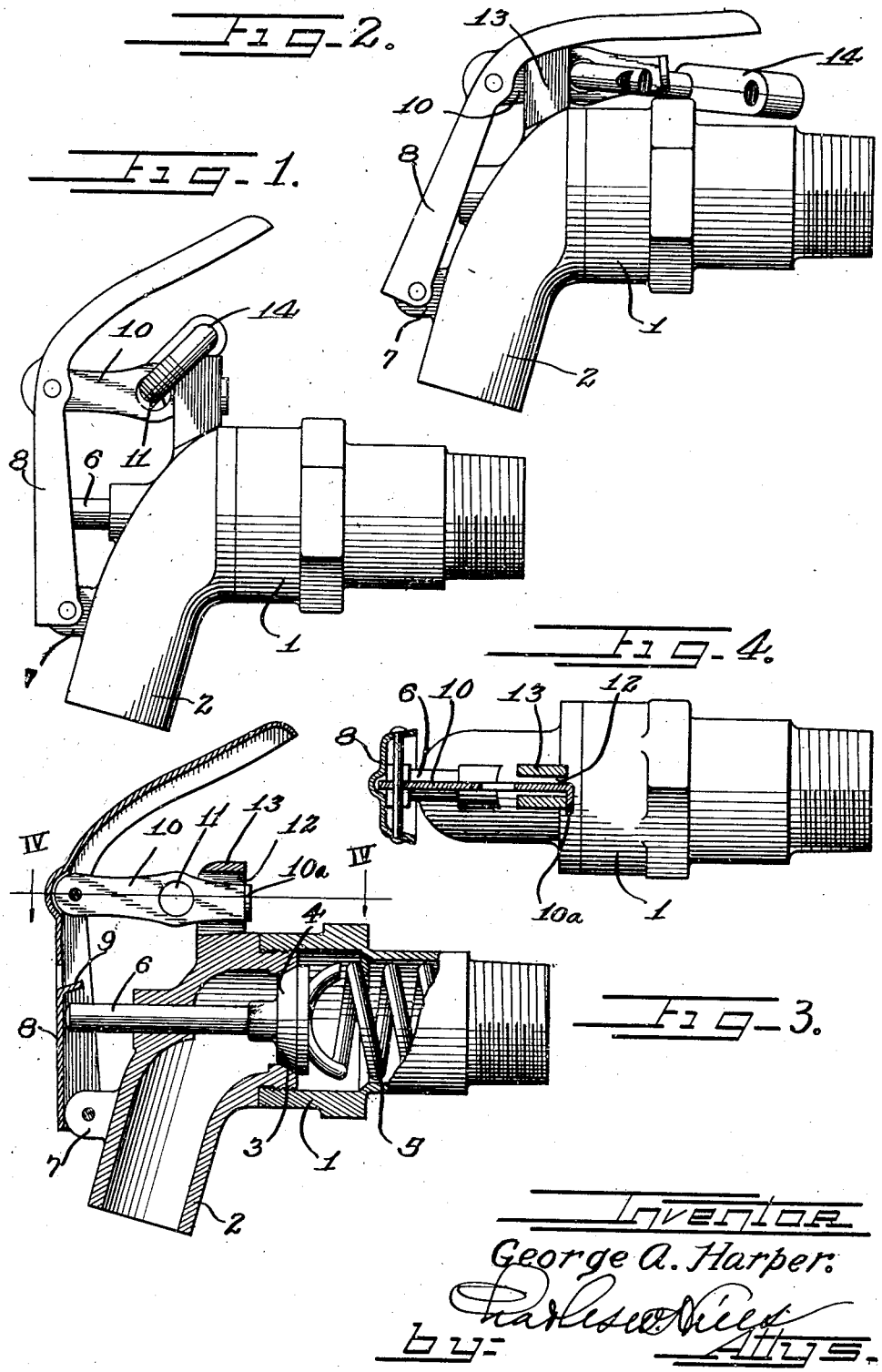
Inventor
George A. Harper
by Charles W. Riley
Attys.

Patented Oct. 11, 1932

1,881,537

UNITED STATES PATENT OFFICE

GEORGE A. HARPER, OF BURLINGTON, WISCONSIN, ASSIGNOR TO BURLINGTON BRASS WORKS, OF BURLINGTON, WISCONSIN, A CORPORATION OF WISCONSIN

VALVE

Application filed November 14, 1930. Serial No. 495,568.

This invention relates to a faucet and concerns itself with means for locking the faucet against operation or locking it in its open position.

The invention comprises the novel structure and combination of parts hereinafter described and more particularly pointed out and defined in the appended claims.

In the accompanying drawing which illustrates a preferred form of this invention, and in which similar reference numerals refer to similar features in the different views:

Figure 1 is an elevational view of a faucet involving this invention.

Figure 2 is a similar view illustrating the faucet locked in its open position.

Figure 3 is a part-sectional and part-elevational view illustrating certain features of construction.

Figure 4 is a sectional view upon the line IV—IV of Figure 3 illustrating the valve housing in elevation.

In referring to the drawing, there is shown a faucet housing 1 having a discharge nozzle 2 which is provided with a valve seat 3 against which a valve 4 is normally pressed by a coil spring 5 within the housing. The valve 4 is provided with a stem 6 which slidably extends through a suitable aperture in the nozzle. Upon the aforementioned nozzle 2 there is a lug 7 to which a valve operating lever 8 is pivoted at one end. This lever is made of sheet metal and in the form of a channel having its web struck downwardly as indicated at 9 at a point above the valve stem 6 to preclude the insertion of a tool between the web of the lever and the stem 6 for opening the valve. This safeguard prevents the unauthorized opening of the valve which, it might be mentioned, is adapted for use in connection with the sale of gasoline and other liquids.

A member 10 is pivoted to the lever 8 intermediate the ends thereof and is provided with an aperture 11. This member 10 is adapted to pass through an aperture 12 in a lug 13 extending from the nozzle 2. The pendant member 10 is provided with a right angle flange 10a upon its lower end which is adapted to engage beneath one wall of the lug 13 as shown in Figure 4 and limit the upward movement of the lever 8. This member 10 also guides the lever and maintains the same in proper position upon the housing.

When the valve is in its closed position, the aperture 11 will be above the lug 13 as shown in Figure 3 and a padlock such as indicated by the reference numeral 14 may be applied to the member 10 by passing the hasp through the aperture 11 for locking the lever against downward movement and opening the valve 4. When it is desired to lock the valve 4 in its open position, the lever will be pressed against the stem 6, until the aperture 11 passes below the lug 13 when the padlock 14 may again be applied as shown in Figure 2 for locking the valve in its open position.

From the foregoing it will be appreciated that a very simple means has been provided whereby the faucet operating lever may be locked against operation or may be locked in position when the valve is fully opened. It is obviously possible to lock the faucet against unauthorized use and the same means may be employed for locking the faucet in its fully opened position.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a faucet having a housing, a spring impelled valve with its stem projecting beyond said housing, a lever pivoted on said housing and having engagement with said valve stem, a member pivotally connected to said lever, said housing having a lug for receiving and guiding said member and means for locking said member against movement in two directions.

2. In a faucet having a housing, a spring impelled valve having a stem extending through the housing of said faucet, a lever pivoted to said housing and engaging over the end of said stem, a member pivotally connected to said lever, said housing having an apertured lug for receiving said member and means for locking said member against movement.

3. In a faucet having a valve stem, a lever pivoted to said faucet and engaging said valve stem, said lever having a struck out portion for preventing access between said stem and lever and means for locking said lever in operative and inoperative position.

4. In a faucet comprising a housing having an apertured lug, a valve having a stem projecting through said housing, a lever pivoted to said housing and engaging said stem, a member pivoted to said lever and engaging in the aperture of said lug and means for locking said member in a plurality of positions.

5. In a faucet comprising a housing having an apertured lug, a valve within said housing having a stem projecting thru said housing, a lever pivoted to said housing and engaging the end of said stem, a guide member pivoted to said lever and engaging said apertured lug, and means for locking said guide member in a plurality of positions.

6. A faucet comprising a valve housing having a nozzle, a spring impelled valve within said housing and having a stem extending through the wall thereof, a lever pivoted to said nozzle and engaging over the end of said stem, a member pivoted to said lever, said housing having a slotted guide for receiving said member, said member having an aperture for receiving a padlock for locking said member to said guide when said valve is in its open or closed position and said lever having a lug between said stem and member for the purpose set forth.

7. A faucet comprising a valve housing having a nozzle, a spring impelled valve in said housing and having a stem projecting through said housing, a channel shaped lever pivoted to said nozzle and engaging over the end of said stem, a locking member pivoted to said lever, and means for locking said member to said housing, said lever having a lug adjacent said stem and located between said stem and locking member for the purpose set forth.

In testimony whereof I have hereunto subscribed my name at Burlington, Racine County, Wisconsin.

GEORGE A. HARPER.